UNITED STATES PATENT OFFICE.

LUDWIG SCHOLVIEN, OF BERLIN, GERMANY.

PROCESS OF MAKING DIMETHYLPHENYLPYRAZOLONE.

SPECIFICATION forming part of Letters Patent No. 460,186, dated September 29, 1891.

Application filed January 23, 1891. Serial No. 378,755. (No specimens.) Patented in France July 28, 1890, No. 207,274, and in Belgium July 28, 1890, No. 91,424.

*To all whom it may concern:*

Be it known that I, LUDWIG SCHOLVIEN, doctor of philosophy, chemist, a subject of the Emperor of Germany, residing at Berlin, Germany, have invented certain new and useful Improvements in the Production or Manufacture of Dimethylphenylpyrazolone, (for which Letters Patent have been granted to S. D. Riedel in Belgium July 28, 1890, No. 91,424, and in France July 28, 1890, No. 207,274;) and I do hereby declare the following to be a full, clear, and exact description of the invention, such as will enable others skilled in the art to which it appertains to make and use the same.

The invention relates to the production or manufacture of dimethylphenylpyrazolone; and it consists in a novel process of obtaining this chemical.

If phenyl hydrazin ($NH_2-NH-C_6H_5$) and acetylacetic ether ($CH_3COCH_2COOC_2H_5$) are combined in molecular proportions, the reaction will result in condensation under separation of water and formation of phenylhydrazinacetylacetic ether ($CH_3C(N_2HC_6H_5)-CH_2COOC_2H_5$,) according to Fisher, (*Berichte der D. Chem. Ges.*, 1883, vol. 16, p. 661.) As found by Knorr, when this product of condensation is heated a separation of one molecule of alcohol takes place, thereby forming methylphenylpyrazolone, ($C_{10}H_{10}N_2O$.) I have discovered that the last-named operation of heating for the conversion of the phenylhydrazinacetylacetic ether into methylphenylpyrazolone may be dispensed with. In fact, I have found that this conversion or separation of alcohol takes place of itself if the compound is allowed to rest. If molecular quantities of a compound of phenyl hydrazin and acetylacetic ether are allowed to stand for about two days, the separation of the resultant methylphenylpyrazolone in the form of a crystalline mass ensues.

My invention consists in a novel mode or process of methylating this chemical body, and this mode or process may be practically carried out as follows:

One hundred and sixty parts, by weight, of methylphenylpyrazolone; one hundred and fifty parts, by weight, of sodium methyl sulphate; fifty parts, by weight, of hydriodic acid of a strength of about fifty per cent., and one hundred parts, by weight, of methyl or ethyl alcohol are heated in a closed vessel to from about 160° to 180° centigrade, corresponding with a pressure of from twelve to fifteen atmospheres, for about twelve hours, the following reactions taking place: The sodium methyl sulphate reacts with the small quantity of hydriodic acid under formation of acid sulphate of sodium and methyl iodide, ($CH_3SO_4Na+HI=HSO_4Na+CH_3I$,) of which the latter reacts directly with the methylphenylpyrazolone by methylating the latter and under simultaneous formation of hydrogen iodide, ($C_{10}H_{10}N_2O + CH_3I = C_{11}H_{12}N_2O + HI$.) The hydriodic acid becomes at once available again for reaction with fresh sodium methyl sulphate under formation of methyl iodide, which in its turn may be caused to react upon methylphenylpyrazolone under formation of dimethylphenylpyrazolone and hydrogen iodide, &c.

According to my process but a very small quantity of hydrogen iodide seems to be necessary to the complete conversion of the methylphenylpyrazolone, and this is, in fact, the case. The quantity of hydrogen iodide above given is only 8.4 per centum of theoretical quantity.

The dimethylphenylpyrazolone resulting from the reactions above described no doubt combines with the acid sodium sulphate, and this is shown by the considerable proportion of neutral sodium sulphate contained in the final product of the reaction. This combination is probably due to the fact that at the temperature existing in the closed vessel two molecules of the combination of acid sodium sulphate and dimethylphenylpyrazolone yield one molecule of neutral sodium sulphate and one molecule of neutral sulphate of dimethylphenylpyrazolone, ($2NaOSO_2OHC_{11}H_{12}N_2O=SO_2(ONa)_2+SO_2(OHC_{11}H_{12}N_2O)_2$.)

The dimethylphenylpyrazolone is isolated by mixing the brownish crystalline and viscous or semi-fluid product of the reaction with about three times its volume of a mixture of ether and alcohol. This solution is then poured off or otherwise removed from the separated sodium sulphate, and the latter is freed as much as possible from any adhering solution by pressure filtration and washed in a mixture of ether and alcohol. The resulting solution is freed from its ether-alcohol by distillation in the ordinary way. The residue of the distillation is dissolved in water, which leaves a small quantity of a resinous or gummy product, which is filtered off and the filtrate treated with an excess of a sodium lye, and the thus-liberated phenyldimethylpyrazolone is extracted therefrom by means of chloroform. The chloroform solution is then separated from the alkaline liquor and concentrated by eliminating some of the chloroform by distillation. The phenyldimethylpyrazolone separates in the form of crystals from the concentrated chloroform solution when the latter is treated with a considerable quantity of benzine. This crystalline product is then collected and purified by solution in toluol or aceton or alcohol and by recrystallization.

I obtained at two trials an average of 139.7 grams of dimethylphenylpyrazolone with the prescribed proportions in grams of the chemicals referred to, while the theoretical product is only one hundred and seventy-four grams. In other words, I obtained 80.2 per centum of the theoretically-possible product.

According to known processes dimethylphenylpyrazolone has been obtained by prolonged heating in an oil bath of phenyl hydrazin and acetylacetic ether in order to first obtain the methylphenylpyrazolone, which latter was then methylated by treatment with equivalent quantities of methyl iodide. According to my process, which is not only cheaper but can be carried out with greater facility, I methylate the methylphenylpyrazolone resulting from the reaction of phenyl hydrazin and acetylacetic ether without any heating, by using a comparatively small quantity of hydrogen iodide, which is only used for the conversion of the methyl group from the sodium methyl sulphate into the methylphenylpyrazolone.

Having thus described my invention, the following is what I claim as new therein and desire to secure by Letters Patent:

1. The process of obtaining dimethylphenylpyrazolone, which consists in heating molecular quantities of methylphenylpyrazolone and sodium methyl sulphate in the presence of hydriodic acid and of a diluent, as set forth.

2. The process of obtaining dimethylphenylpyrazolone, which consists in heating under pressure molecular quantities of methylphenylpyrazolone and sodium methyl sulphate in the presence of hydriodic acid and of alcohol as diluent, as set forth.

In testimony whereof I affix my signature in presence of two witnesses.

LUDWIG SCHOLVIEN.

Witnesses:
GEORGE LOUBIER,
ADOLF DEMELIUS.